United States Patent
Yoshida et al.

(10) Patent No.: US 6,590,866 B2
(45) Date of Patent: *Jul. 8, 2003

(54) CELL FLOWING RATIO CONTROLLING METHOD AND CELL SWITCHING SYSTEM USING THE SAME

(75) Inventors: Kazuhiro Yoshida, Kawasaki (JP); Naotoshi Watanabe, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/083,591

(22) Filed: May 22, 1998

(65) Prior Publication Data

US 2003/0067875 A1 Apr. 10, 2003

(30) Foreign Application Priority Data

Aug. 13, 1997 (JP) .............................................. 9-218379

(51) Int. Cl.⁷ .................................................. H04J 3/14
(52) U.S. Cl. ........................ 370/232; 370/233; 370/229
(58) Field of Search ................................ 370/232, 230, 370/233, 229

(56) References Cited

U.S. PATENT DOCUMENTS

| | | | | |
|---|---|---|---|---|
| 5,007,043 A | * | 4/1991 | van den Dool et al. | 370/232 |
| 5,014,260 A | * | 5/1991 | Wicklund | 370/232 |
| 5,265,091 A | * | 11/1993 | van Landegem | 370/232 |
| 5,515,359 A | * | 5/1996 | Zheng | 370/232 |
| 5,671,215 A | * | 9/1997 | Foglar | 370/232 |
| 5,694,390 A | * | 12/1997 | Yamato et al. | 370/230 |
| 5,898,689 A | * | 4/1999 | Kumar et al. | 370/232 |
| 5,930,234 A | * | 7/1999 | Yoshida | 370/232 |
| 6,005,868 A | * | 12/1999 | Ito | 370/232 |
| 6,134,218 A | * | 10/2000 | Holden | 370/232 |
| 6,137,779 A | * | 10/2000 | Miller et al. | 370/232 |

FOREIGN PATENT DOCUMENTS

| | | |
|---|---|---|
| JP | 5276186 | 10/1993 |
| JP | 5276188 | 10/1993 |
| JP | 7183888 | 7/1995 |
| JP | 8264381 | 10/1996 |

* cited by examiner

Primary Examiner—Brian Zimmerman
(74) Attorney, Agent, or Firm—Katten Muchin Zavis Rosenman

(57) ABSTRACT

A UPC (cell flowing ratio controlling) function is executed when a plurality of channels are multiplexed in single device. The cell flowing ratio control method and system on a cell switching system for receiving arrival cells transmitted from a plurality of channels and controlling to pass the received cells multiplexes the arrival cells flowing on the plurality of channels; increases only a time counter corresponding to a channel to which an arrival cell is belonging, the time counter being selected from a plurality of time counters provided for the plurality of channels; and controls cell flowing ratio correspondingly to counted value of the increased time counter.

22 Claims, 15 Drawing Sheets

FIG. 2B COUNTER1 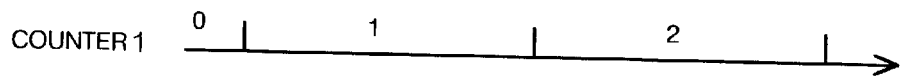
FIG. 2C COUNTER2 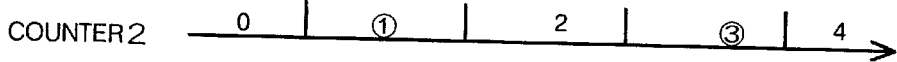
FIG. 2D COUNTER3 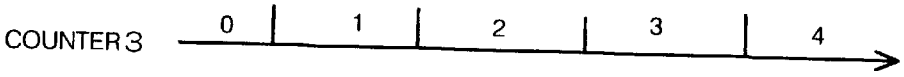
FIG. 2E COUNTER4 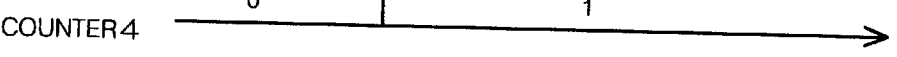
FIG. 2F ARRIVAL PATTERN OF 2-1 CONNECTION OF CHANNEL 2 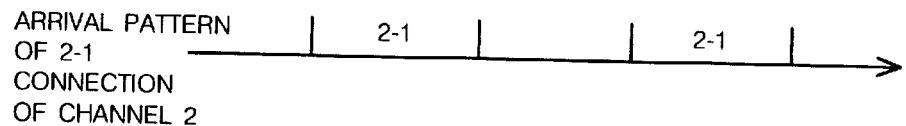

FIG. 15
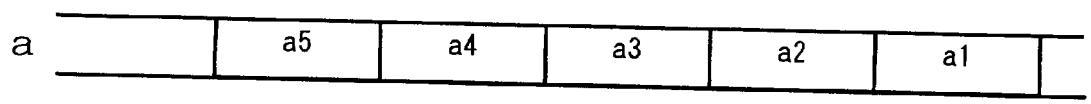
a     a5   a4   a3   a2   a1
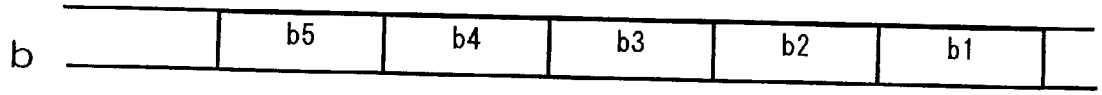
b     b5   b4   b3   b2   b1
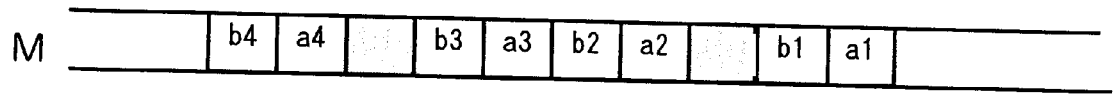
M    b4 a4   b3 a3   b2 a2   b1 a1
a CHANNEL AFTER MULTIPLEXED    a4   a3   a2   a1

CELL FLOWING RATIO CONTROLLING METHOD AND CELL SWITCHING SYSTEM USING THE SAME

BACKGROUND OF THE INVENTION

1. Field of the Invention

The present invention relates to a cell flowing ratio controlling method with UPC, i.e., Usage Parameter Control function for monitoring and controlling an allowable cell flowing ratio in UNI (user to network interface) or NNI (network to node interface) in a cell switching system, such as ATM (asynchronous Transfer Mode) switch, and a cell switching system using the same.

More particularly, it relates to a cell flowing ratio controlling method in which cells flowing on a plurality of channels are multiplexed and UPC function can be executed in single device for the multiplexed cells.

2. Description of the Related Art

A cell switching system, such as ATM switch, has UPC function on subscriber interfaces connected to subscriber terminals through a transmission path. It is general that the UPC function is provided for each subscriber channel.

It is disadvantage from an economical view point to provide a cell flowing controlling device, hereinafter, which is referred as to UPC device, individually for each interface of a relatively low speed. Therefore, a method for employing single UPC device by multiplexing a plurality of the above-described subscriber interfaces will be considered now.

FIG. 12 shows a structural block diagram of an ATM switching system. The system includes an ATM switch 1, an input channel processing section 2 and an output channel processing section 3. The ATM switch is a self-routing switch, such as a Banyan switch, for routing each cell to a destined output transmission path according to a header information of the header section in each cell.

The input channel processing section 2 terminates transmission paths, i.e., physical channels, linking to subscribers SUB, and monitors the cell flowing ratio. The output channel processing section 3 including a function of interfacing with an output transmission path, is formed of a buffer memory 30 and an operation and maintenance administration section 31.

The above-described method for employing single UPC device 20 by multiplexing cells flowing on the plurality of the above-described physical channels in the input channel processing section 2 will be now considered. In this case, outputs from the plurality of subscriber interfaces I/F are inputted to channel multiplexer 21. The UPC device 20 measures a flowing ratio of cell signals multiplexed in the channel multiplexer 21. An operation and maintenance administration section 23 is also provided on the input channel processing device 2.

A header converter 22 converts a virtual channel identifier (hereinafter, referred as VCI) employed on a transmission path, of the cell passed through the UPC device 20 into a VCI employed in the ATM switch. Switching is performed by selecting a path of the ATM switch 1 according to the converted VCI.

FIG. 13 is a diagram for explaining an example for measuring a flowing ratio of the multiplexed output cells from the above-described channel multiplexer 21 in single UPC device 20 when cell flowing on two physical channels (subscriber lines) (a) and (b) are multiplexed. FIG. 14 is a timing chart corresponding to FIG. 13.

Cell sequences corresponding to the subscriber lines (a) and (b) are expressed as (a) and (b) respectively in FIG. 14. M means an output from the channel multiplexer 21 in FIG. 14. The cells flow on subscriber channels (a) and (b) are independent, each of which speed is different. When both timings of the cells coincide with each other such as the cells (a3) and (b4) shown in FIG. 14, it is required to delay either timing of the cell (a3) or (b4) in the channel multiplexer 21.

In the example shown in FIG. 14, the timing of the cell (a3) is delayed. The UPC device 20 holds a cell sequence of each subscriber line and calculates the cell flowing ratio of the cell sequence. Therefore, an interval T1 between the cells (a2) and (a3 becomes wider and an interval T2 between the cells (a3) and (a4) becomes narrower on the cell sequences, corresponding to the subscriber line (a), separated from an output of the channel multiplexer 21.

Accordingly, fluctuation occurs on cell arrival timings at the input of the UPC device 20. The fluctuation makes limitation of accuracy for the UPC function.

There is a further problem to limit the UPC accuracy when a ratio of the speed after multiplexed to the total speed in interface circuit I/F does not become suitable ratio in addition to the problem that the cell speed becomes different for each subscriber line.

FIG. 15 is an explanatory diagram of the above-described problem. As difference between the speed after multiplexed and the speed in interface circuit I/F does not become a suitable multiple of the speed on the physical channel correctly, null or invalid cells should be inserted for a remaining areas or spaces when inputting to the UPC device 20. In FIG. 15, areas illustrated by oblique lines, i.e., an area between the cells (b1) and (a2) and an area between the cells (b3) and (a4), of the cell sequence (M) after multiplexed are the inserted null cells.

It is apparent from FIG. 15 that fluctuation on the cell sequence in the channel (a) after multiplexed occurs, caused by the inserted null cells.

Additionally, when multiplexing the plurality of channels to input to the single UPC device 20, the UPC function should be performed in speed faster than total of transmission speed of the channels.

However, in the UPC device 20, it is required to perform a floating point calculation to obtain accurately within a wide range from a low speed rate to a high speed rate. A capacity of a memory can be reduced by the floating point calculation. However, it is required to take much time for decimal point calculation. It is one factor for giving a limit to device operation.

SUMMARY OF THE INVENTION

Accordingly, it is an object of the present invention to provide an UPC (cell flowing ratio monitoring) device to overcome the above-described problems when cells flowing on a plurality of channels are multiplexed to perform UPC function in the single UPC device 20.

Further, other objects of the present invention will become clearly from explanation of embodiments according to the attached drawings.

BRIEF DESCRIPTION OF THE DRAWINGS

FIGS. 2A to 2F show timing charts for explaining operations shown in FIG. 1.

FIG. 15 is a diagram for explaining a problem that accuracy of UPC is limited when a sum of a speed after multiplexing and a speed in each interface circuit is not suitable ratio.

DESCRIPTION OF THE PREFERRED EMBODIMENTS

Figure 1:
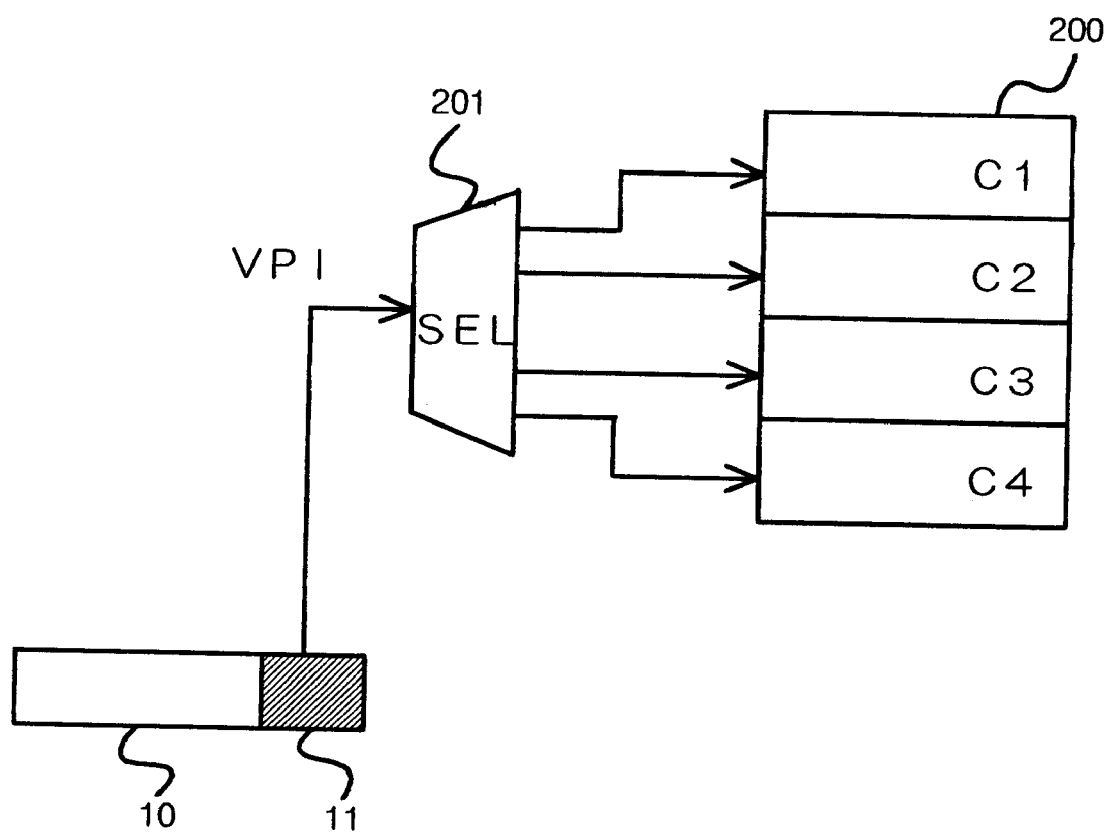
FIG. 1 explains a principle of a first feature of an UPC device according to the present invention.

Embodiments according to the present invention will be now explained in accompanying with the attached drawings. Throughout the following descriptions, the same reference numerals and symbols are used to denote and identify corresponding or identical components.

Before explaining embodiments according to the present invention, features of an UPC device according to the present invention will be now explained.

Schedule Administration in Each Physical Channel

Figure 12:
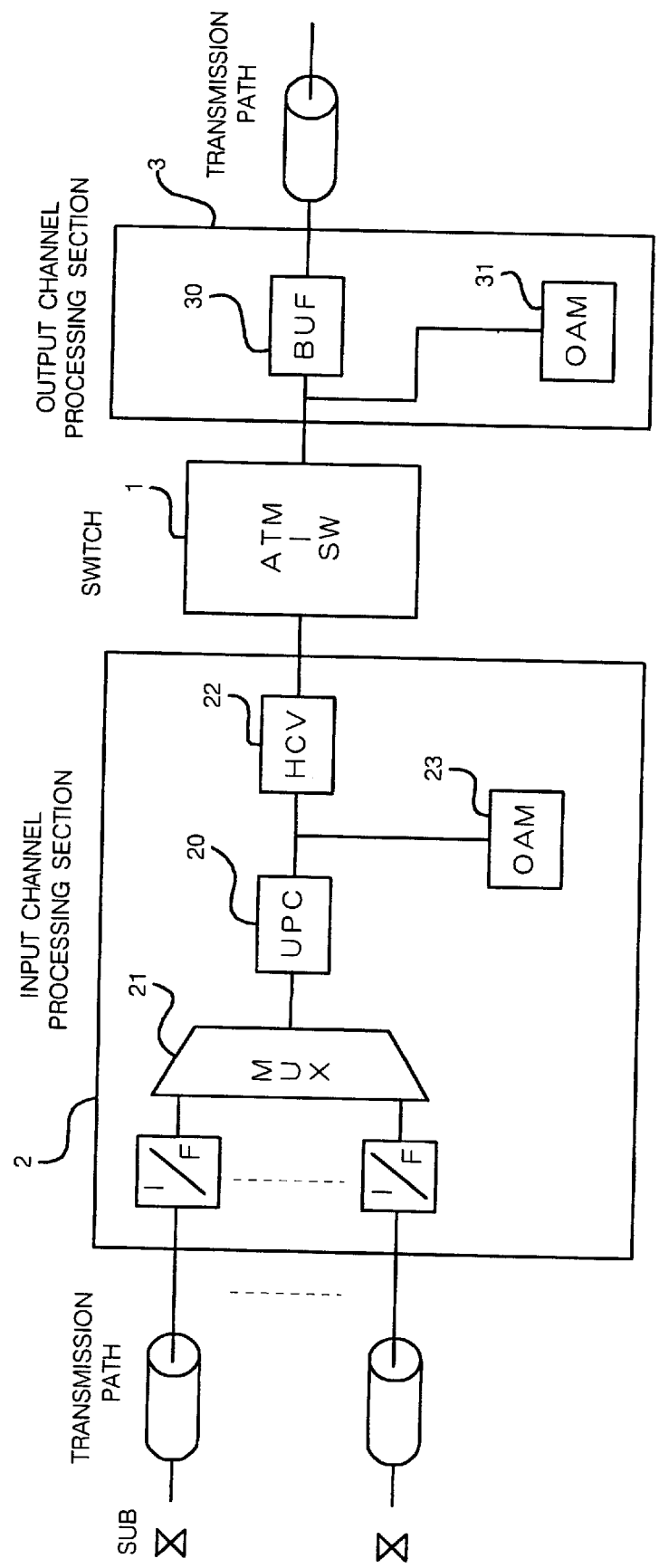
FIG. 12 is a structural block diagram of an ATM switching system.
Figure 13:
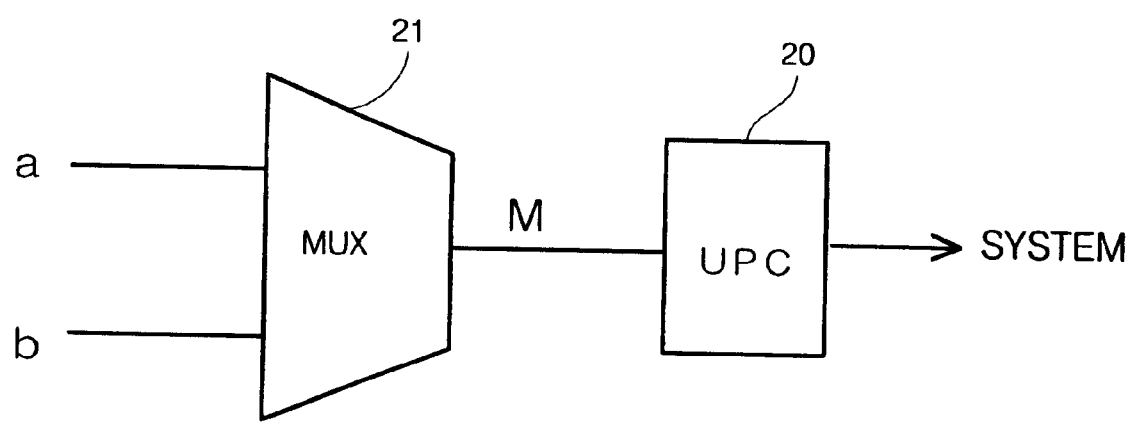
FIG. 13 is an explanatory diagram of a relationship between a multiplexer and an UPC device when two subscriber lines are multiplexed.
Figure 14:
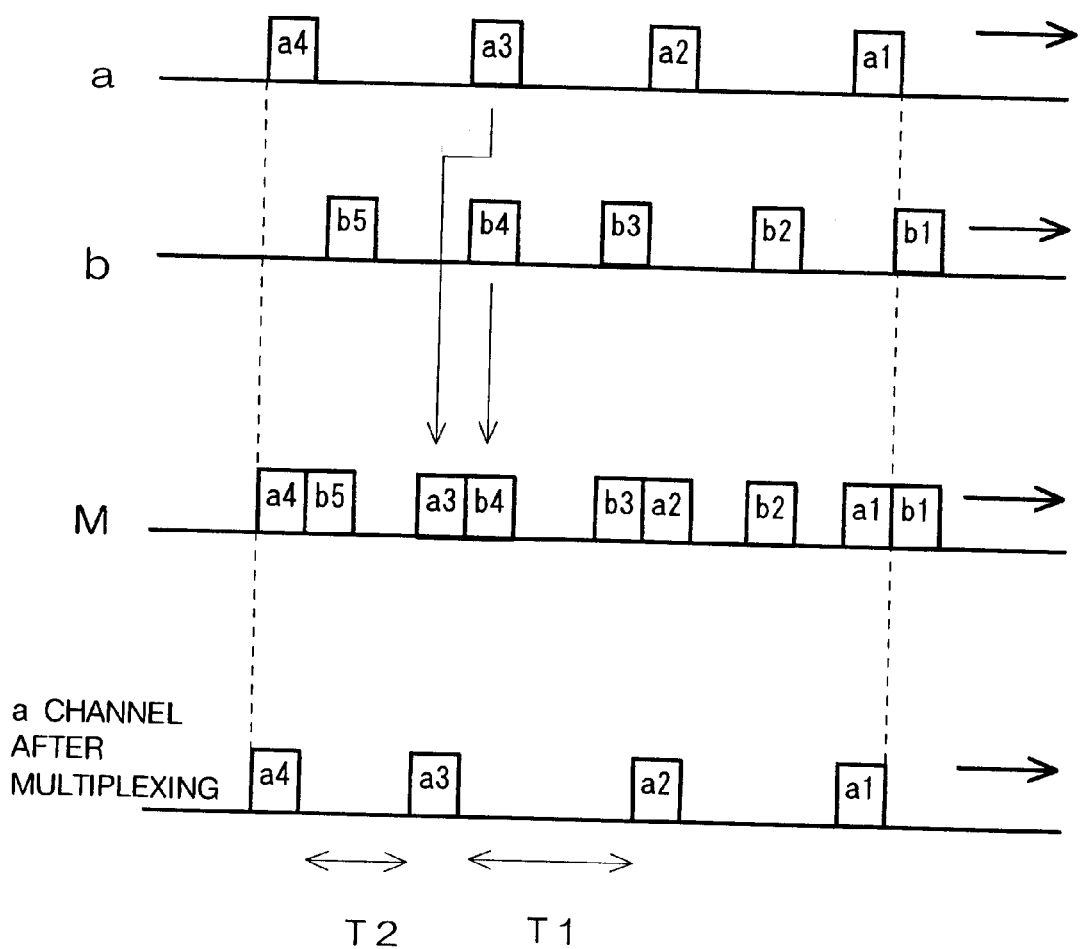
FIG. 14 is a timing chart corresponding to FIG. 13 for explaining a problem in the conventional channel multiplexer.

FIGS. 1 and 2A through 2F show an outline for explaining a first feature of an UPC device according to the present invention. The first feature is to solve a problem caused by difference in transmission speed of physical channels when the channel multiplexer 21 multiplexes cells flowing on a plurality of subscriber lines as shown in FIG. 12.

That is, when the transmission speed of physical channels becomes different, a time axis to be administrated corresponding to each of channels to be multiplexed also becomes different. Therefore, time counters are prepared for all physical channels in the present invention.

In an example shown in FIG. 1, a counter 200 and a selector 201 are provided on UPC device 20. In this example, four time counters C1 to C4 are prepared in the counter 200 corresponding to four physical channels on which cells to be multiplexed are flowing. Every time each cell flowing through a physical channels has arrived, selector 201 selects a corresponding one of the time counters C1 to C4 in counter 200 to increase a counter value thereof.

That is, selector 201 distinguishes a physical channel to which the arriving cell is belonging from a header section 11 of a cell 10 outputted from channel multiplexer 21, not shown in FIG. 1, by employing a cell identifier, that is, a VPI (virtual path identifier). The selector 201 selects one of the time counters C1 to C4, corresponding to the physical channel in the counter 200 according to the VPI value to increase the counter value by +1.

Figure 2A:
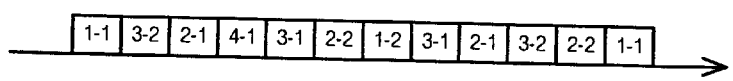

FIGS. 2A to 2F show timing charts showing the above-described situation. FIG. 2A shows a sequence of cells obtained by multiplexing outputs from interface circuits I/F in the channel multiplexer 21 (refer to FIG. 12). A number attached to each cell of the cell sequence is a VPI-VCI, i.e., a virtual path identifier-virtual channel identifier. For example, 3-2 means connection number 2 of channel number 3.

Therefore, counted values in the time counters C1 to C4 of the counter 200 for the cell sequence shown in FIG. 2A are respectively shown in FIGS. 2B to 2E. FIG. 2F shows an arrival pattern of a cell corresponding to connection 1 of channel 2. In this way, it is possible to obtain a cell flowing ratio in each connection belonging to each channel number from a count value of the time counter corresponding to each channel of counter 200.

Informing Physical Channel Numbers

Figure 3:
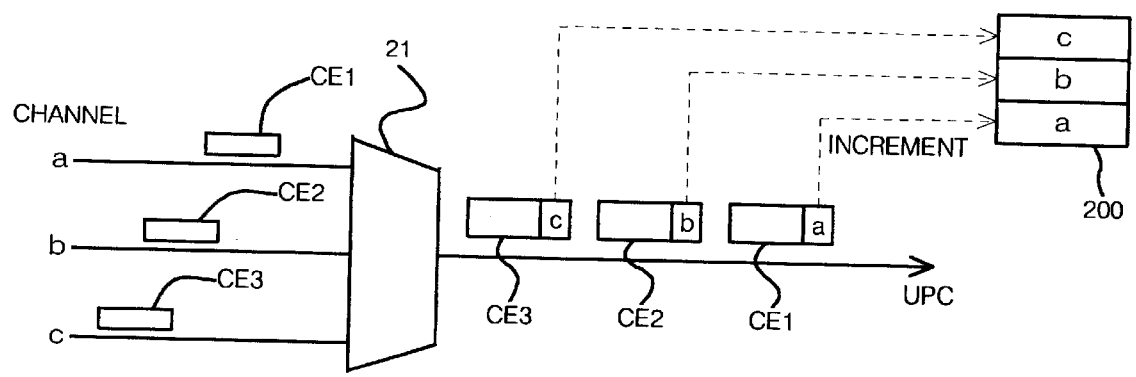
FIG. 3 explains a principle of other feature according to the present invention.

FIG. 3 shows an outline of a further feature according to the present invention. In this structure, when a physical channel to which a concerned cell is belonging can not be distinguished from the cell identifier, the channel multiplexer 21 informs the physical channel number again, in FIG. 1.

In FIG. 3, when the channel multiplexer 21 multiplexes cells, a physical channel number is attached to each of the multiplexed cells. Cells CE1, CE2 and CE3 are respectively transmitted from the physical channels (a), (b) and (c). Therefore, channel numbers (a), (b) and (c) are respectively attached to the cells CE1, CE2 and CE3 outputted from channel multiplexer 21 as shown in FIG. 3.

Every time the selector 201 shown in FIG. 1 detects the cells to which the channel numbers (a), (b) and (c) are attached, the corresponding time counters in the counter 200 are increased by +1. In the structure shown in FIG. 3, an optional VPI/VCI can be assigned to an optical physical channel.

Controlling a Sum of Physical Channel Speeds

Here, there is a case where null cells prepared for speed control are inputted to channel multiplexer 21 besides valid cells transmitted from physical channels. In this case, it is a still further feature of the present invention that the null cells are indicated as not belonging to any channel.

Figure 4:
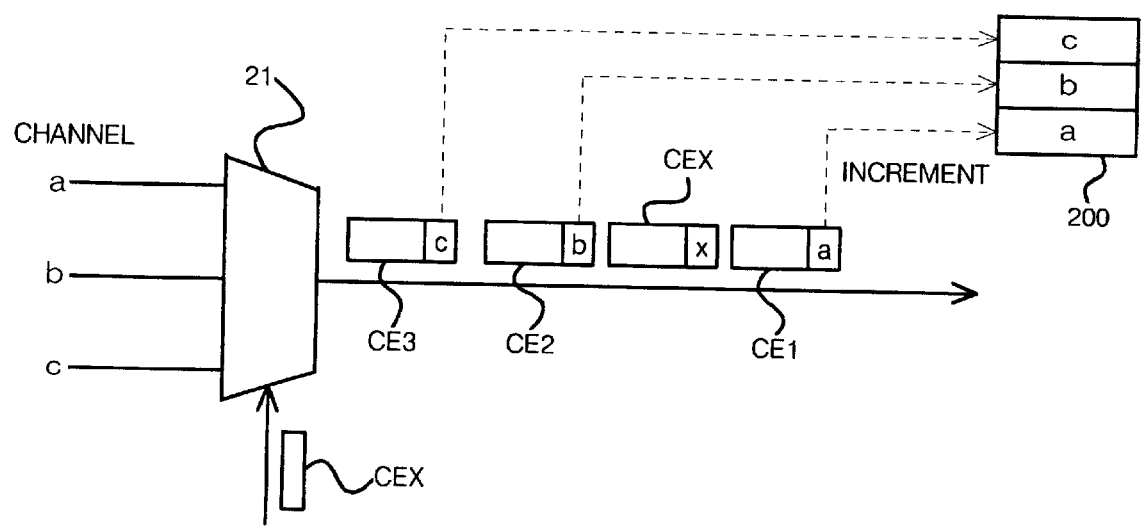
FIG. 4 further explains a principle of other feature according to the present invention.

As shown in FIG. 4, when multiplexing valid cells of the channel (a), (b) and (c), an invalid or null cell CEX is inserted in channel multiplexer 21. Therefore, as shown in FIG. 4, the invalid cell CEX for speed control, to which header section including the x indication which means an invalid cell is attached, is outputted from the channel multiplexer 21 in addition to the cells CE1, CE2 and CE3 respectively corresponding to the multiplexed channels (a), (b) and (c).

Then, the selector 201 distinguishes a channel number corresponding to each cell, similarly to FIG. 1. As the invalid cell CEX has no corresponding channel number, it is proper not to distinguish the invalid cell CEX.

Thereby, the corresponding time counter in the counter 200 is increased by +1 corresponding to the cell of which channel number has been distinguished. On the other hand, the invalid cell CEX has no effect on increment on any of the time counters.

Overflow Processing of a Time Counter

UPC is a function to obtain an actual cell flowing ratio and discard cells exceeded than a pre-reported cell flowing ratio, so that equivalent channel operation becomes possible to all channels.

To execute the function, counter 200 including time counters required for numbers of the multiplexed channels is employed in the UPC device 20 to obtain an actual cell flowing ratio as described above.

Every time a cell in each corresponding physical channel arrives, the counted value in each of the time counters provided for the number of the multiplexed channels in the above-described counter 200 is increased.

Each of the above-described time counters can be realized as a hardware having a predetermined bit length, or a software, and the counting length of the time counters can not be infinite. In addition, a plurality of connections are belonging to one physical channel. Therefore, a difference between the previous cell flowing time and the currently cell flowing time, i.e., an interval of cell flowing, is calculated to estimate the number of flowing cells in each connection. Then, a counting range of the time counter is finite as described above. Therefore, an output of the same counted up value is repeated within a predetermined period.

Accordingly, it is necessary to store an overflow flag showing how many times the time counter has overflowed between the previous cell flowing time and the current cell flowing time, i.e., the time counter is returned from the maximum counted value to zero, in each connection.

However, a different connection belonging to the same subscriber channel is counted in the same time counter of the counter 200 as described above. Therefore, when the time counter overflows, the cell flowing interval for the connection concerned is calculated based on a wrong overflow flag in the case that the cell to which updating of the overflow flag has not been completed is flowing for the connection belonging to the same subscriber channel.

To solve the above-described problem, the same technique may be employed as that employing a difference between a counted value of the time counter and a connection identifier, for example, a VPI/VCI, as a time counter for the connection concerned, as proposed previously in Japanese patent application No. 8-30715 by the present applicant even in the case that the UPC function is executed in single UPC device by multiplexing the channels according to the present invention.

In such the technique, a time having an unique offset is defined for each connection, and only the connection concerned can be processed to overflow at a timing when the time is returned to zero, namely overflowed.

In here, a time counter value that is a basic value is defined as a global time counter value. Additionally, a further time counter value which is shifted away from the global time counter value for a size corresponding to each connection is defined as a local time counter value. The two counter values are employed for each connection to perform the overflow processing.

In the result, when one local time counter value overflows, only one connection is required to update the overflow flag. Updating the overflow flag for the one connection can be completed within an interval shorter than the flowing interval required for one cell.

Figure 5:
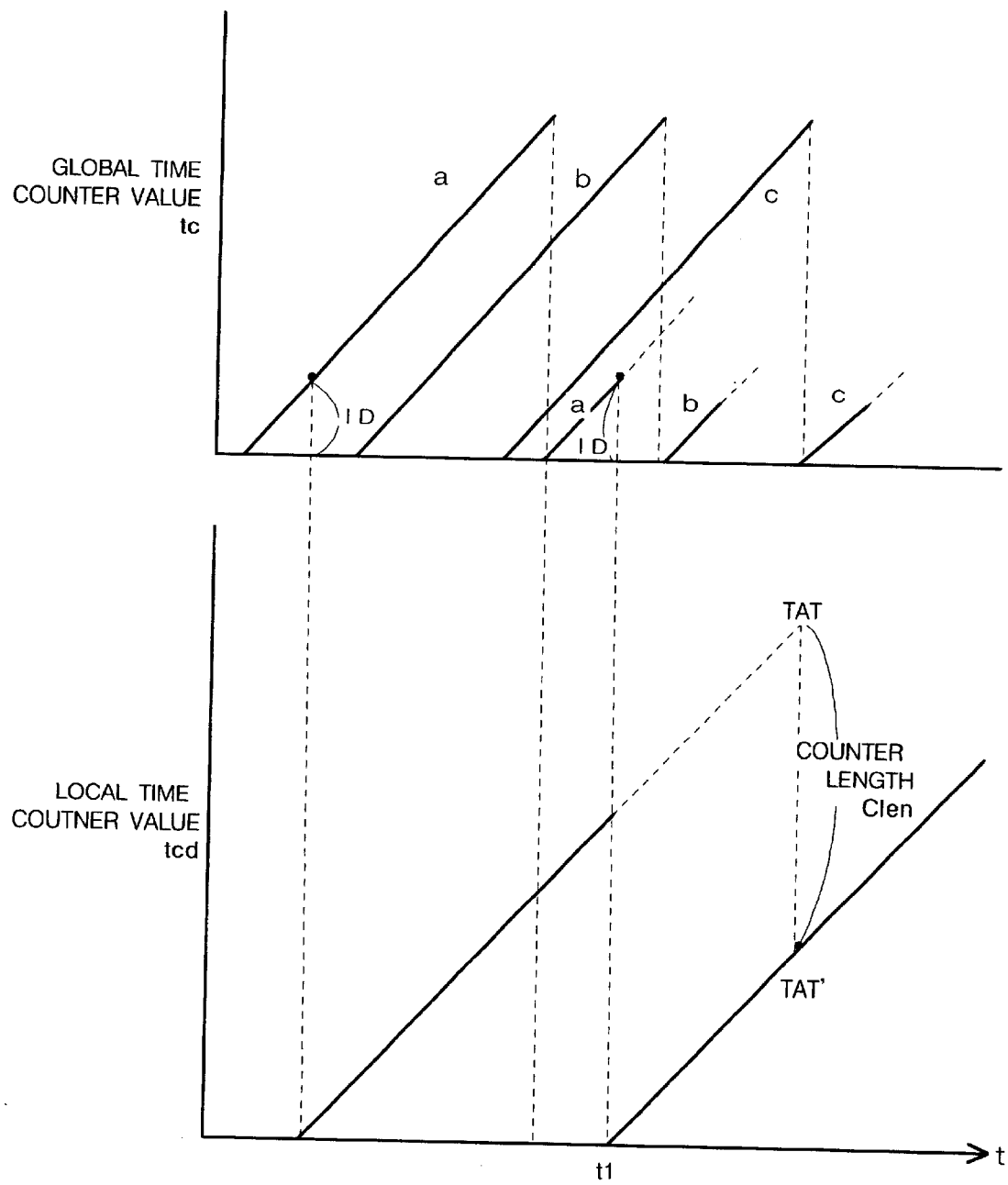
FIG. 5 explains about a time counter in every connection belonging to one physical channel.

As shown in a detailed example of FIG. 5, a counter value obtained by subtracting the value of the cell identifying number ID prescribed by the connection identifier VPI (virtual path identifier)/VCI (virtual channel identifier) of one connection from the global time counter value tc is defined as a local time counter value tcd corresponding to the connection.

In FIG. 5, the local time counter value tcd overflows at a time t1. That is, when the global time counter value tc becomes equivalent to a value ID, the local time counter value tcd is processed to overflow.

The overflow processing is performed as follows: At first, a time corresponding to a length Clen of the time counter is subtracted from the next theoretical arrival time shown by TAT, i.e., Theoretical Arrival Time. The obtained value TAT' is used as a next theoretical arrival time to continue increasing the local time counter value tcd.

In here, the time corresponding to the time counter length Clen can be defined as a specific value relating to (the maximum counter value +1) of the time counter. Therefore, the overflow processing is performed by subtracting the specific value relating to (the maximum counter value +1) of the time counter corresponding to the connection concerned from the theoretical arrival time.

In FIG. 5, only a connection identifier ID of a physical channel (a) is shown as a local time counter value tcd. As the value of the identifier varies for each connection, a time having an unique offset is defined for each connection included in one physical channel, and only the connection concerned can be overflowed at a timing when the time is returned to zero.

As there are a plurality of physical channels in the structure, where cells flowing on the a plurality of channels are multiplexed and a plurality of time counters are employed corresponding to the physical channels, which is an object of the present invention, the technique disclosed in the previously filed patent application can not be employed as it is. Accordingly, in the present invention, the plurality of time counters are employed to perform the overflow processing as explained by FIG. 6 as follows:

In the present invention, the UPC device 20 includes a TAT memory 62. The TAT memory 62 stores each physical channel number to which a TAT (theoretical arrival time) to be set corresponds to each connection in advance is belonging, in relation to the TAT.

As similarly to the outline shown in FIG. 1 that is the first feature of the present invention, a channel number 60 is extracted from a header section 11 of the inputted cell 10, and a selector 201 selects the corresponding time counter to be increased (added by +1). In the example shown in FIG. 6, the time counter (a) is selected as the channel number 60 of the inputted cell 10 corresponds to the channel (a).

Then, a counter value 61 after increment is used as an indicator showing a TAT of a connection to be performed the overflow processing, and then access to the above-described TAT memory 62 can be performed according to the indicator. The indicated TAT has no relation to the inputted cell.

Therefore, a channel number stored in the TAT memory 62 is read out according to the TAT corresponding to a counter value 61 after increment. When the channel number to be read is the same as a channel number to which the inputted cell is belonging, it means the time counter of the connection corresponding to the inputted cell concerned has reached to a maximum value, and therefore, it becomes subject to overflow processing.

Figure 6:
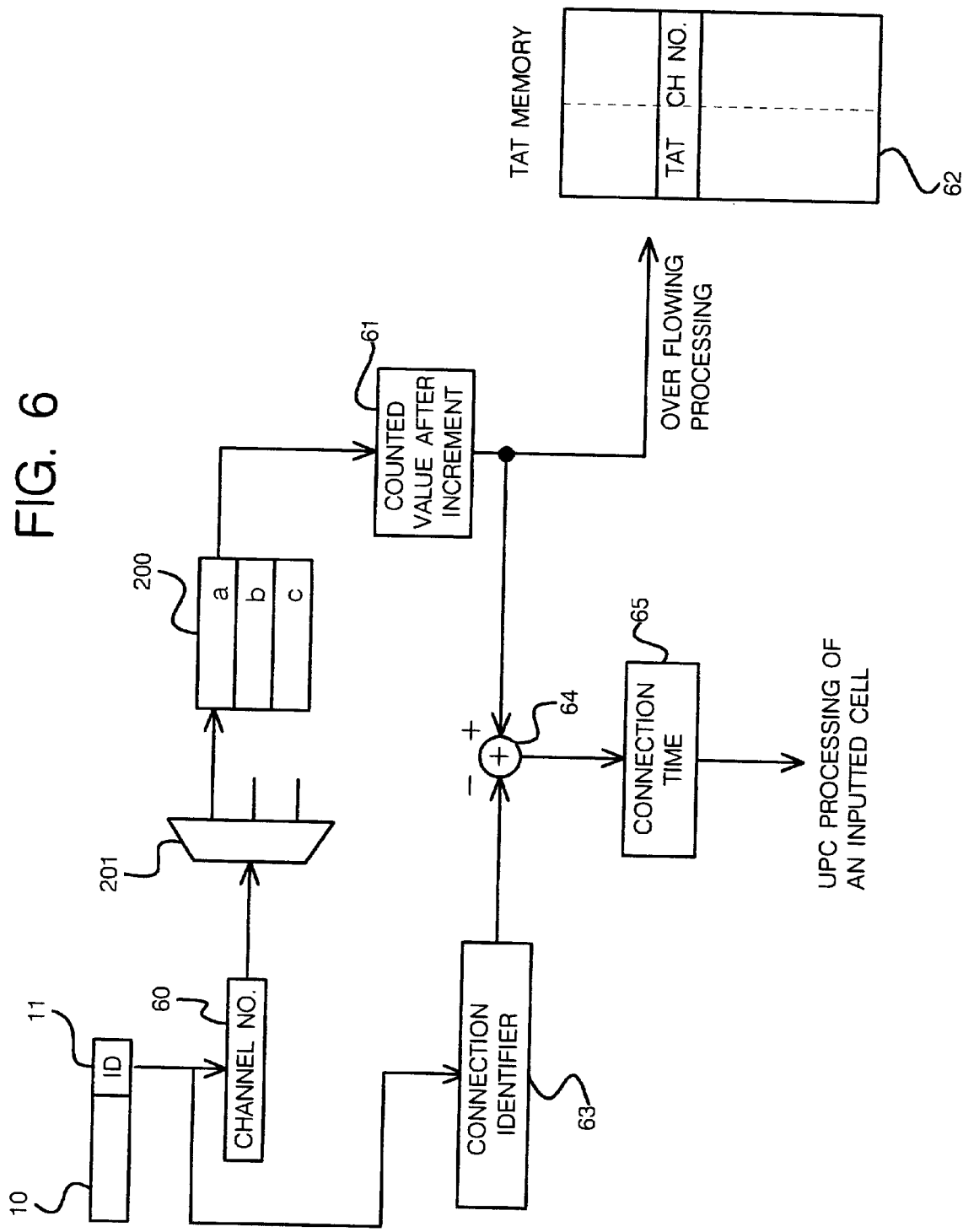
FIG. 6 is a first explanatory diagram of a feature of the present invention employing the time counter shown in FIG. 5 on a structure in which a counter is employed corresponding to a physical channel.

For example, in FIG. 6, a cell having the connection identifier ID belonging to the physical channel (a) is inputted. Then, the time relating to the ID connection is shown as the following table 1:

TABLE 1

| COUTER a AFTER INCREMENT | CONNECTION TIME | CONNECTION TO BE OVERFLOWED |
|---|---|---|
| 0 | 0-ID = Clen − ID | 0 |
| 1 | 1-ID = Clen + 1-ID | 1 |
| 2 | 2-ID = Clen + 2-ID | 2 |
| 3 | 3-ID = Clen + 3-ID | 3 |
| n | n-ID = Clen + n-ID | n |

In the table 1, Clen means a length of a time counter. Even if a value of the counter (a) is zero, time can be shifted by the connection identifier (ID). That is, in FIG. 6, a subtracter 64 subtracts the connection identifier (ID) 63 from a counted value 61 after increment, i.e., a global time counter value. The subtracted value is a time for the connection concerned, i.e., a local time counter value. The connection time 65 can be obtained from the global and local time counter values. Thereby, the UPC processing can be executed. In this way, only one connection is required for overflow processing.

The subtracter 64 further executes a subtraction by adding a number obtained by reversing each bit code of the connection identifier 63 and adding it by +1, i.e., a complement number of (2) for the connection identifier 63, to the global time counter value, which is a counted value 61 after increment.

Figure 7:
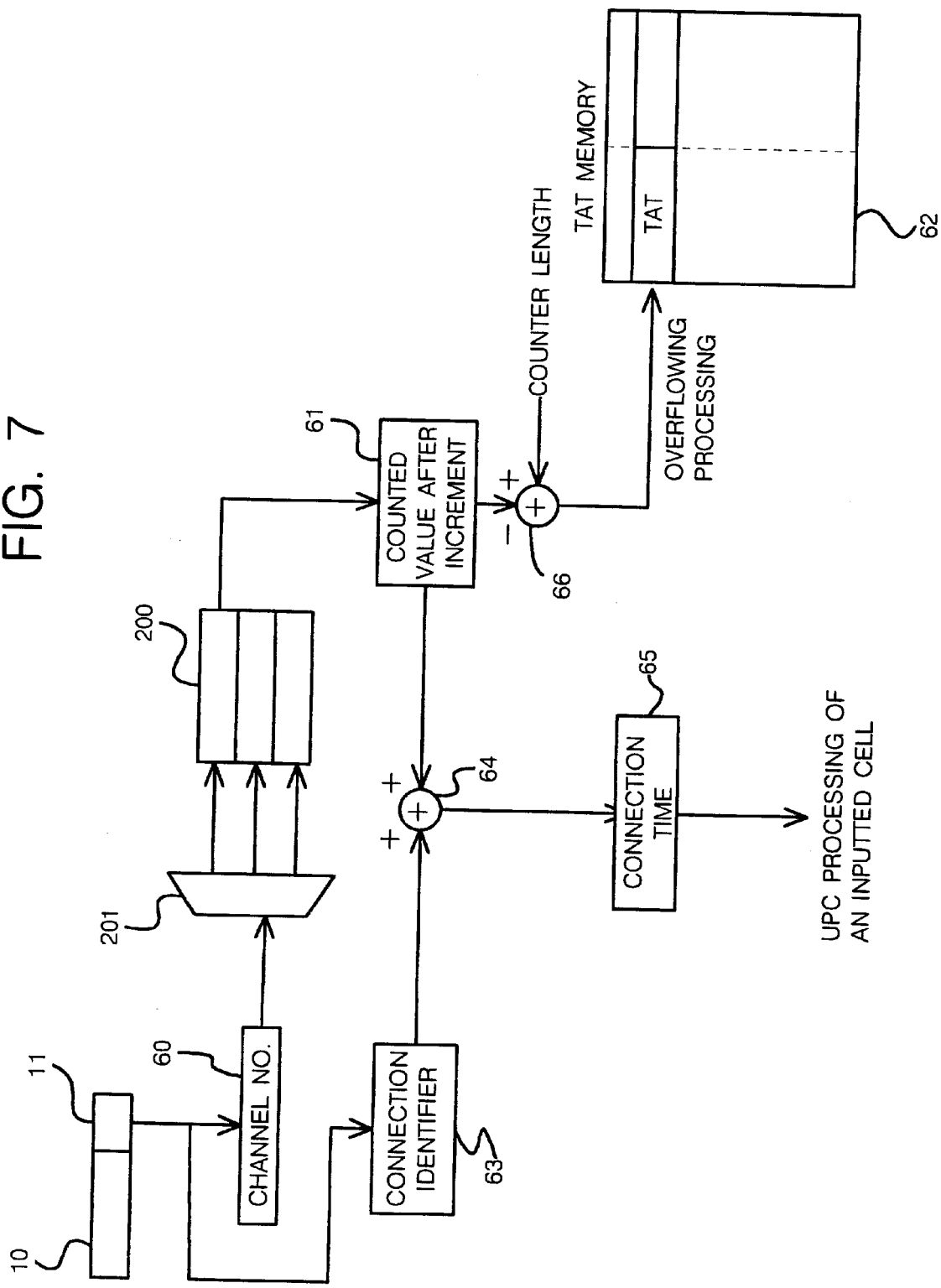
FIG. 7 is a second explanatory diagram of a feature of the present invention employing the time counter shown in FIG. 5 on a structure in which a counter is employed corresponding to a physical channel.

In here, the connection identifier ID is particular to each connection. Therefore, as described above in FIG. 6, a connection identifier 63 is subtracted from the counted value 61 after increment, i.e., a global time counter value in the subtracter 64. Then, it is possible to structure as shown in FIG. 7 instead of using the result as a time for the connection concerned, i.e., a local time counter value.

The relationship between a global time counter value 61 and the connection identifier 63 becomes as shown in a table 2:

TABLE 2

| COUNTER a | CONENCTION TIME | CONNECTION TO BE OVERFLOWED |
|---|---|---|
| 0 | 0 + ID | 0 |
| 1 | 1 + ID | Clen-1 |
| 2 | 2 + ID | Clen-2 |
| 3 | 3 + ID | Clen-3 |
| n | n + ID | Clen-n |

That is, an adder 66 adds a connection identifier 63 to a counted value 61 after increment, i.e., a global time counter value. In this case, too, a time used as a time counter becomes different for each connection, and therefore, only one connection is required for the overflow processing.

If a connection of which identifier ID is (2) is belonging to the physical channel (b) in the table 1, the connection times can be illustrated as shown in tables 3 and 4.

TABLE 3

| COUNTER a AFTER INCREMENT | CONNECTION TIME | CONNECTION TO BE OVERFLOWED |
|---|---|---|
| 0 | 0-ID = Clen − ID | 0 |
| 1 | 1-ID = Clen + 1-ID | 1 |
| 2 | 2-ID = Clen + 2-ID | — |
| 3 | 3-ID = Clen + 3-ID | 3 |
| n | n-ID = Clen + n-ID | n |

TABLE 4

| COUNTER b AFTER INCREMENT | CONNECTION TIME | CONNECTION TO BE OVERFLOWED |
|---|---|---|
| 0 | 0-ID = Clen − ID | — |
| 1 | 1-ID = Clen + 1-ID | — |
| 2 | 2-ID = Clen + 2-ID | 2 |
| 3 | 3-ID = Clen + 3-ID | — |
| n | n-ID = Clen + n-ID | n |

Connection times in the physical channel a are shown in the table 3 and connection times in the physical channel (b) are shown in the table 4. A connection identifier ID=2 does not exist in the physical channel a illustrated in the table 3. Even if the counted value in the time counter corresponding to the physical channel (a) is (2), the overflow processing is not executed.

On the other hand, when the counted value of the time counter (b) corresponding to the physical channel (b) is 2, it is required to execute overflow processing because the connection belonging to the physical channel (b) concerned is present.

As explained above, information to which channel, i.e., time counter, the TAT, i.e., a connection is belonging is stored in TAT memory 62 shown in FIGS. 6 and 7 in relation to the TAT. Thereby, when the TAT is belonging to the same physical channel as the inputted cell, the overflow processing is executed.

UPC Processing by the Use of a Semi Fixed Desimal Point Calculation

When a connection time 65 is obtained in FIG. 6 or 7, the UPC processing is executed. In here, the UPC device 2 employs a floating point calculation to perform the UPC processing on connections having widely characteristics ranged from high speed connection that is more than 150 Mbps to low speed connections which is 64 Kbps.

However, when employing the floating point calculation, a load imposing on a CPU required for the calculation becomes heavier. Therefore, it is a feature of the present invention that the UPC processing is executed by the use of a semi fixed decimal point calculation when the connection time 65 is obtained.

Further, it is a still further feature of the present invention that a floating point calculation for the UPC processing is executed without deteriorating accuracy of the UPC processing, and further an UPC device having a small scaled circuit can be realized.

Figure 8:
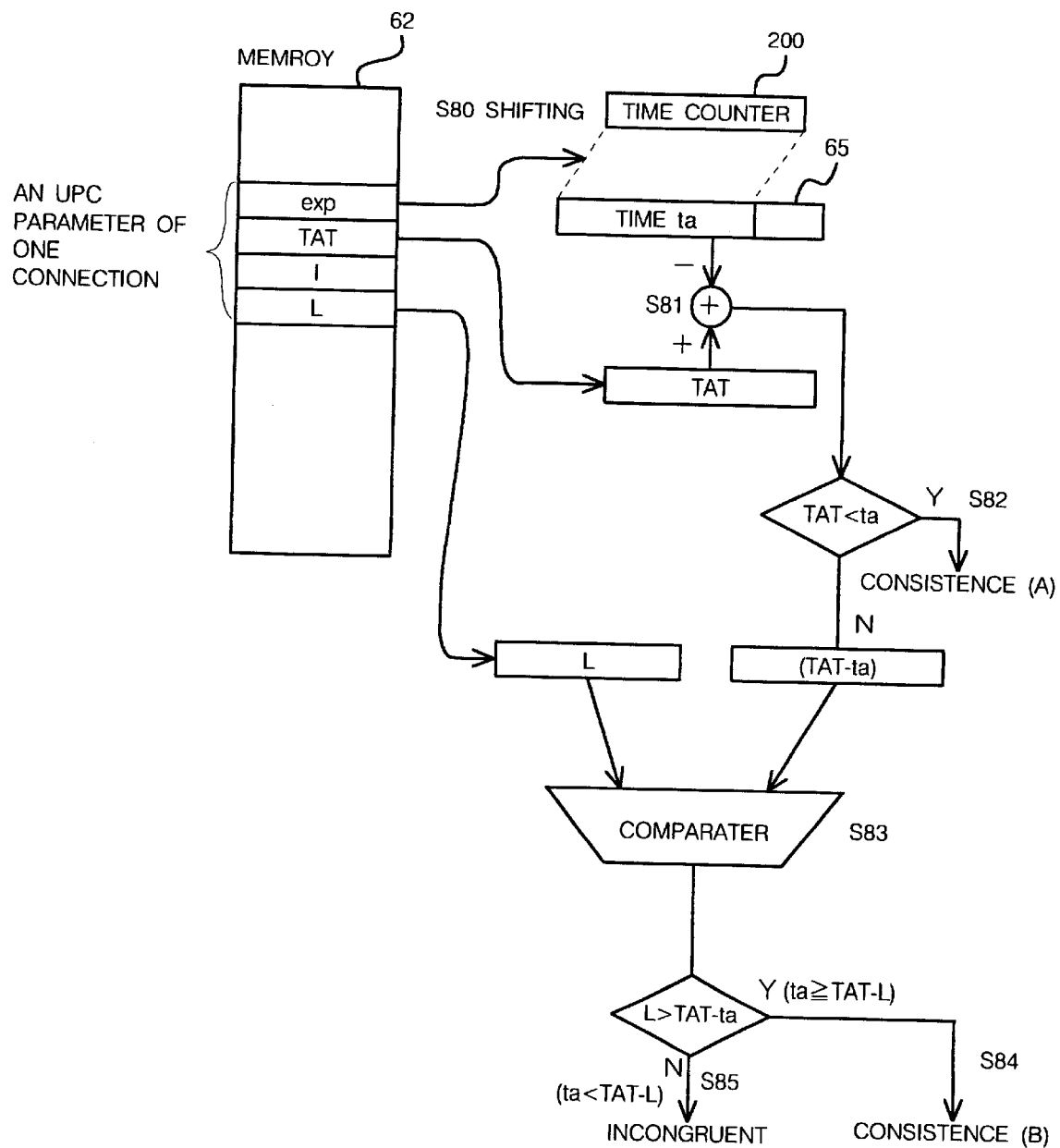
FIG. 8 is an operational flowing chart for performing UPC processing with the use of VS by employing a floating point calculation as an example according to the present invention.

FIG. 8 illustrates an operational flowing chart of the UPC processing executed by VS, i.e., virtual scheduling algorithm, by employing a semi fixed floating point calculation as an example according to the present invention.

In the conventional processing, TAT (Theoretical Arrival Time), I (Increment Parameter), L (Limit Parameter) are stored as parameters for each cell in floating point form in order to use them in the calculation. In this example, I (Increment Parameter) is an increment value for expressing a prescribed cell flowing interval.

It is a matter to be considered how earlier cells have arrived than TAT, and therefore, L (Limited Parameter) indicates an allowable value within the cells may arrive earlier than TAT.

In the present invention, all of these parameters are converted into fixed decimal points. Then, the positions of the decimal points that these parameters have are representatively stored in a memory 62 as parameters named exponential values exp instead of these parameters. A figure of the time counter is shifted according to the exponential values exp, and then, the calculation is performed.

When setting each parameter TAT, I, or L from a firmware, each position of the decimal points may be controlled in advance. An absolute value of the positions of the decimal points can be controlled by shifting the figure of the time counter.

In FIG. 8, an exponential value exp is read out from the memory 62 to adjust the figure of the connection time 65 for each connection obtained in FIG. 6 or 7, and then, the figure is shifted by adjusting to the size of the exponential value exp (STEP S80). The position of the decimal point of which figure is shifted in the current time value ta is the same as that of the TAT.

Then, a difference between the time value ta and the TAT is calculated (STEP S81). In the result, the time value ta is further compared with the TAT. If TAT<ta, the TAT is the past time that means the situation to allow the cell flowing. Therefore, the time value ta is judged as having a consistence (A) (STEP S82).

On the other hand, if the TAT is larger than the time value ta, L is compared with (TAT—ta) (STEP S83). If ta≧TAT—L, the difference between the time value ta and the TAT is within an allowable range L. Therefore, it is judged that there is a consistence (B) on the relation (STEP S84). Additionally, if ta<TAT—L, the difference is exceeded from the allowable range L, it is judged that the relationship is incongruous (STEP S85).

Then, on the case of the above-described consistence (A), the current time ta is rewritten to the memory 62 as a newly updated value. On the case of the consistence (B), (TAT+I) that means the values required for a parameter I is added to the TAT is further rewritten to the memory 62.

In the conventional floating point calculation, it is required to control the position of the decimal point every time parameters are read out from a memory. In addition, when rewriting the value to the memory, it is required to separate the value into an exponential part and a mantissa.

On the contrary, on the above-described structure according to the present invention, shifting figures of the time counter is executed only one time in one calculation. Then, the position of the decimal point can be modified by the exponential value exp in each connection. Therefore, the calculation can be executed without deteriorating the accuracy.

Overflow Processing on the UPC Processing Using a Semi Fixed Decimal Point Calculation On the above described structure shown in FIG. 8, TAT becomes different from the position of the decimal point of the time counter for each connection. Therefore, the overflow processing can not be executed for each connection by the above-explained method for subtracting a constant value from the TAT.

Figure 9:
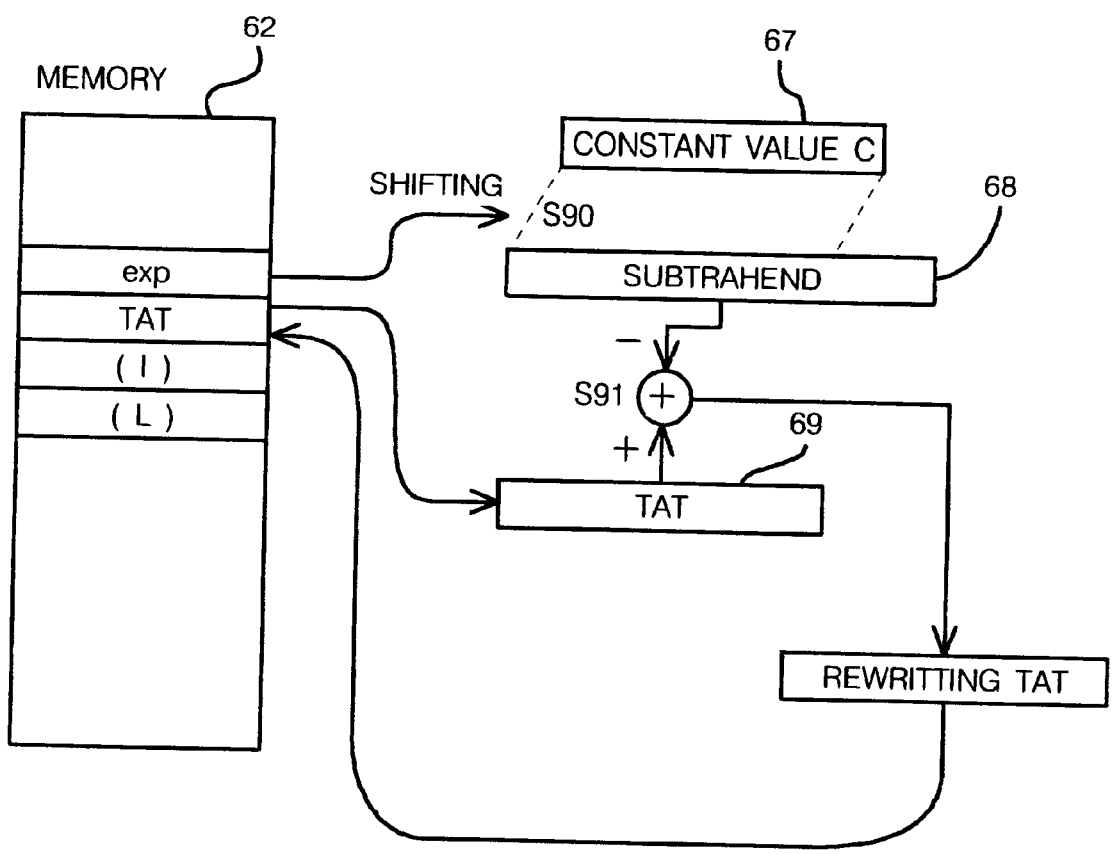
FIG. 9 is an operational flowing chart of overflow processing by the use of a semi fixed decimal number calculation.

Therefore, as shown in FIG. 9, a length of the time counter (the maximum value of the time counter +1) is used as a constant value (C) 67. The constant value 67 is shifted by the value required for the exponential value exp (STEP S90). Then, the shifted value is used as a subtrahend 68 of the TAT 69. The subtrahend 68 is subtracted from the TAT 69 (STEP S91).

A shifting processing (STEP S90) explained in FIG. 9 is the same as a shift processing (STEP S81) shown in FIG. 8 having a different purpose. Therefore, a hardware can be commonly used for both processing.

Although FIG. 9 is structured without considering to multiplex a plurality of physical channels, it can be easily realized to multiplex the plurality of physical channels by combining the steps shown in FIGS. 6 and 7.

A structural example of an UPC device according to the present invention explained above will be now explained. FIG. 11 is a block diagram of an embodiment employing features described above. In the embodiment, cells flowing on the plurality of physical channels should be multiplexed as shown in FIG. 10.

Figure 10:
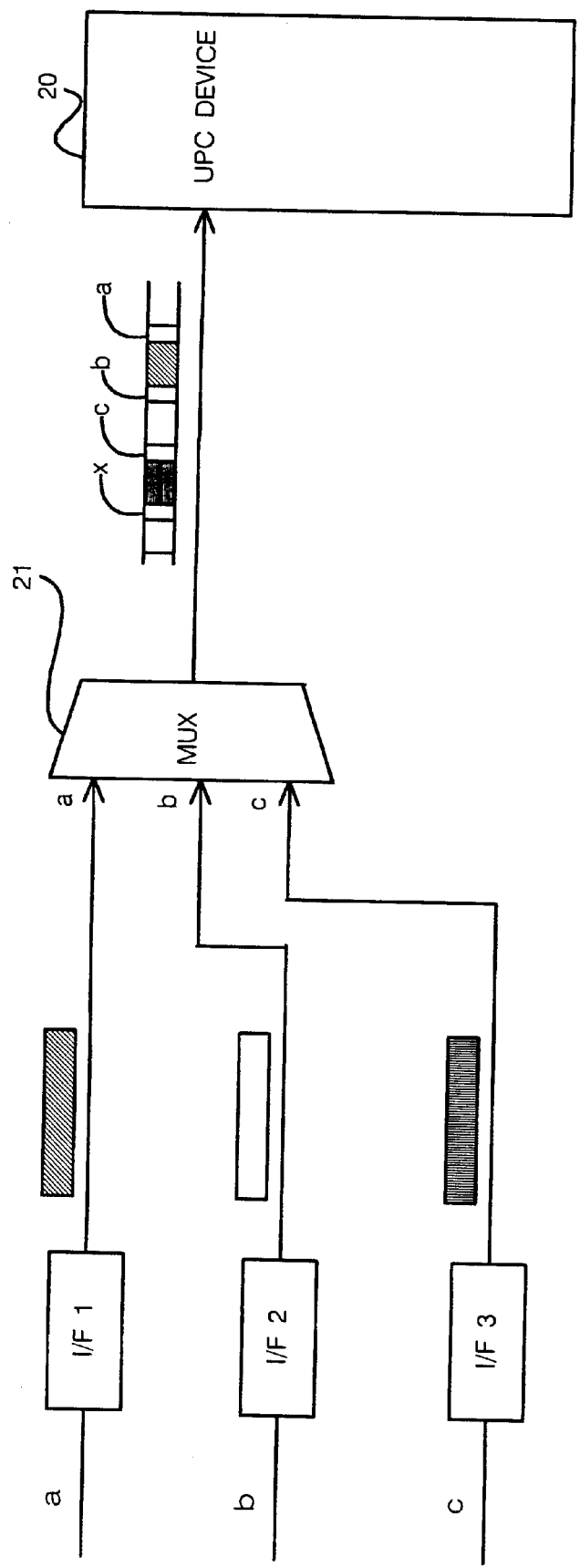
FIG. 10 is an explanatory diagram of one embodiment in which three physical channels are multiplexed according to a feature of the present invention.
Figure 11:
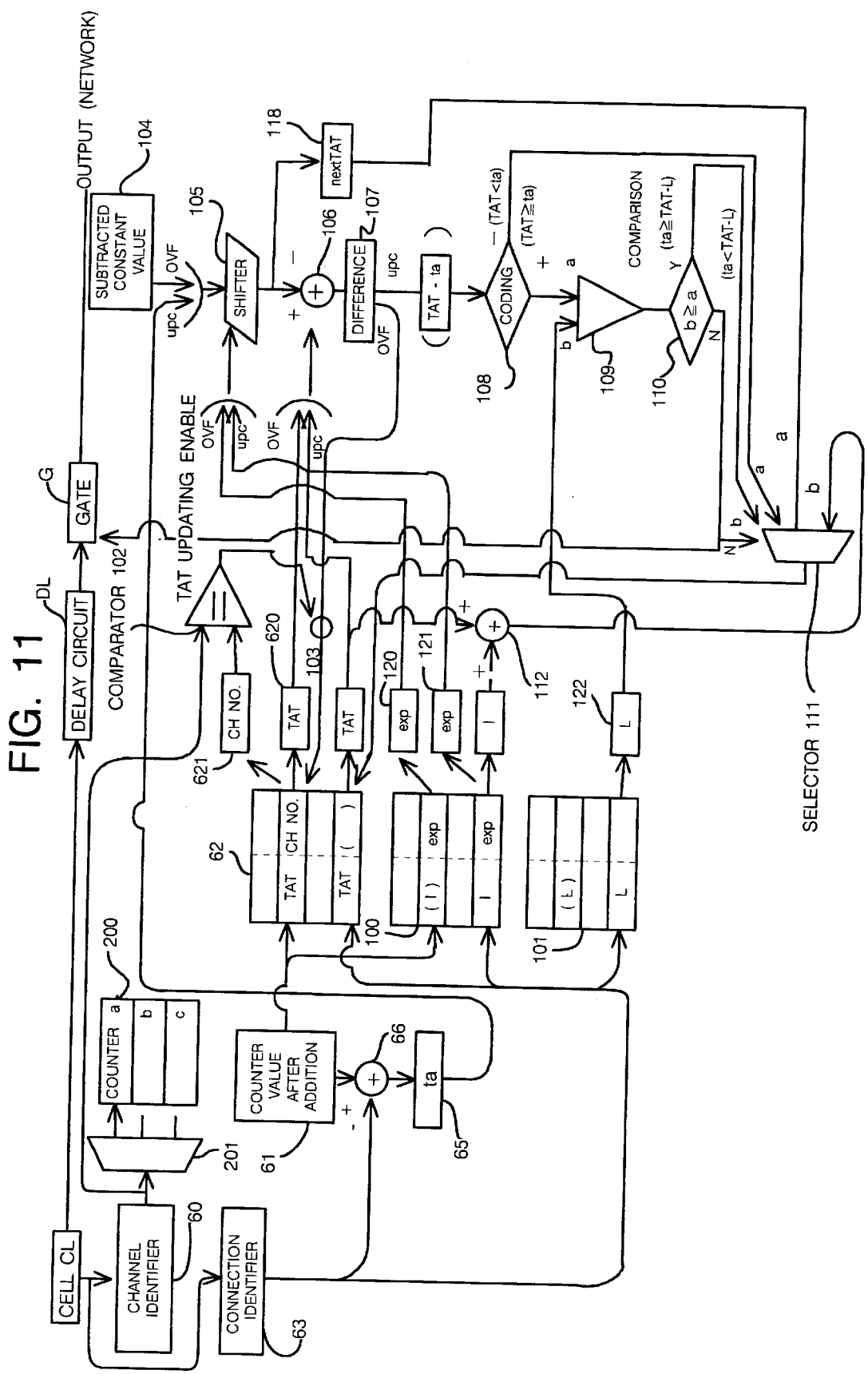
FIG. 11 shows an embodiment according to a feature of the present invention using the structure shown in FIG. 10, and it is a structural block diagram including a processing flowing chart.

In FIG. 10, a multiplexer 21 multiplexes cells on three physical channels (a), (b) and (c) of three physical layer terminators I/F1 to I/F3 to transmit to the UPC device 20. A plurality of connections are included in each physical channel as described above.

The channel multiplexer 21 further attaches the corresponding channel identifier (a), (b) or (c) to each inputted cell to transmit to the UPC device 20 when multiplexing the cells transmitted from each channel. When the transfer speed after multiplexing the cells becomes higher, null cells X are multiplexed and inputted for speed adjustment.

A structure of the UPC device 21 shown in FIG. 11 will be now explained based on multiplexing of the physical channels (a), (b) and (c) shown in FIG. 10.

The channel identifier 60 and the connection identifier 63 can be distinguished from the inputted cell CL. A selector 201 selectively adds and increases +1 to the time counter (a) of the counter 200 for the corresponding physical channel by the channel identifier 60.

The counted value 61 of the time counter (a) after adding by +1 shows a time of the corresponding physical channel.

If a cell of a specified physical channel is not incoming, the time counter for the channel is not increased. Therefore, there is no problem even when multiplexing cells flowing on physical channels having different speeds. Both the UPC processing and the overflow processing of the counter are not performed concurrently. After one processing is finished, the other processing is executed.

In this example, the overflow processing is performed at first. The overflow processing will be now explained. In the overflow processing, the counter value after increment is used as an index (address), and a TAT and a channel number are read out from the TAT memory 62 according to the index.

That is, as explained above, a channel number to which the connection is belonging is stored for each connection, i.e., each TAT, in the TAT memory 62. Therefore, a TAT 620 and a channel number 621 can be read out from the TAT memory 62 according to the counted value 61 after increment.

Concurrently, an exponential value exp corresponding to an increment information I to be accessed according to a counted value 61 after increment is read out from the memory 100.

If the connection does not coincide to the increased time counter, i.e. the connection is not belonging to the corresponding channel, the overflow processing is not required. Therefore, a comparator 102 compares a channel number 621 stored relating to the TAT with a channel identifier 60 of the inputted cell. On this comparison, if the channel number 621 is not corresponding to the identifier 60, updating TAT is suspended (refer to 103 shown in FIG. 11).

If the number 621 is corresponding to the identifier 60, the TAT is updated to TAT' as shown in FIG. 5. Therefore, a shifter 105 shifts the figure of a subtracted constant value (Clen) 104 from the TAT according to the exponential value exp, and then an adder 106 subtracts the figure shifted value from the TAT 620. The result of the subtraction 107, i.e., a difference between the time ta and the TAT, is rewritten as the updated TAT' in the memory 62, and then overflow processing is performed.

The adder 106 may perform the subtraction calculation by adding a value of the TAT 620 to a number obtained by adding 1 to a bit sequence obtained by reversing each bit of an output from the shifter 105, i.e., a complement number of 2 for an output from the shifter 105.

In FIG. 11, the shifter 105 and the adder 106 can be commonly used in this overflow processing and the UPC processing which will be described later.

Additionally, the subtracted constant value 104 shifted by the shifter 105 is determined in relation to the numbers of the bits of the counter 200. For example, when the length of the counter 200 is 16 bits, and the prescribed position of the decimal point is between bits 13 and 14, i.e., the exponential value exp=0, a subtracted constant value $(-2^{29})$ corresponding to 16 bits+13 bits=29 bits may be prepared.

If the exponential value exp of the connection on which the overflow processing is performed is 5, $-2^{(29-5)}=2^{24}$ can be obtained by the shifter 105. By subtracting the obtained value from the TAT 620 and rewriting the result 107 to the memory 62, the overflow processing is completed.

Next, the UPC processing to be executed will be explained. UPC parameters TAT, I and L corresponding to the connections stored in the memories 62, 100 and 101 and an information of the position of the decimal point, i.e., an exponential value exp, which are referred by the connection identifier 63 are employed on the UPC processing.

Current time ta 65 peculiar to each connection is employed on a counting function of the UPC processing. The time ta 65 can be obtained by subtracting a connection identifier (number) 63 from the value 61 to which +1 is added when inputting the cell, in the adder 66.

Thereby, even if each connection time is the same, the time ta 65 has a different value in each connection. It is required for the UPC processing to adjust the figure of the time ta 65 to that of the TAT. The figure adjusting processing is realized by shifting only the exponential value exp 121 by the shifter 105.

The result is temporally stored in a register 118, because there is a possibility that the difference 107 becomes a next TAT, and then the difference 107 between the shifted time ta and the TAT is obtained to judge on a decision 108 the relation of the size according to codes.

On the judging processing, if the difference becomes a minus value, i.e., TAT<ta, the TAT of the inputted cell is a past time. Therefore, TAT is judged as consistent. In this case, the cell is transmitted to a network through a delay circuit DL and a gate G.

Then, the shifted time ta temporally stored in the register 118 is rewritten to the memory 62 through a selector 111.

When TAT≧ta, the cell has arrived earlier than the scheduled TAT. Therefore, the following judgement is required. That is, it should be judged how earlier the cell has arrived than the scheduled TAT. The comparator 109 compares the relation between the sizes of L showing an allowable range and that of the value of TAT—ta.

If ta≧TAT—L, it is judged that the value is within an allowable range. TAT+I is rewritten to the memory 62 as a next TAT. The TAT+I is obtained by adding I read out from the memory 100 to the TAT read out from the memory 62 in the adder 112. Then, the inputted cell is also transmitted to the network through the delay circuit DL and the gate G.

If ta<TAT—L, the cell CL has arrived earlier than the allowable value L for the scheduled arrival time TAT, it is judged that the value is incongruent. In this case, the TAT is not updated and the cell CL is discarded by closing the gate G.

As explaining the embodiments according to the attached drawing, in the present invention, even if a plurality of cells flowing on plural physical channels are multiplexed, fluctuation is not generated between multiplexed cells. Even if physical channels having different speed are multiplexed, independent UPC can be constructed, and there is no influence on the UPC processing for other physical channels, according to the present invention.

Additionally, a fixed decimal point calculation can be employed for wide range of transmission speed. Therefore, a system can be operated in high speed and can be formed with a small hardware.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A cell flowing ratio control method on a cell switching for receiving arrival cells transmitted from a plurality of channels and controlling to pass the received cells, comprising the steps of:

multiplexing the arrival cells flowing on said plurality of channels;

increasing only a time counter corresponding to a channel to which an arrival cell is belonging, said time counter being selected from a plurality of time counters provided for the plurality of channels; and controlling cell flowing ratio correspondingly to counted value of said increased time counter.

2. The cell flowing ratio control method according to claim 1,

Wherein the step of multiplexing attaches an identifier identifying each channel to which the arrival cell is belonging, and the step of increasing increases a time counter corresponding to a channel identified by the identifier.

3. The cell flowing ratio control method according to claim 1, wherein the step of multiplexing inserts dummy cells which are not belonging to any of the plurality of channels, and are used only for cell speed adjustment.

4. The cell flowing ratio control method according to claim 2, wherein the step of multiplexing inserts dummy cells which are not belonging to any of the plurality of channels, and are used only for cell speed adjustment.

5. The cell flowing ratio control method according to claim 1,
wherein each of the plurality of time counters has counter values respectively shifted for each of a plurality of connections which are belonging to a corresponding channel, and the counter values are controlled to overflow at timings respectively shifted.

6. The cell flowing ratio control method according to claim 1,
wherein each of the plurality of time counters provided correspondingly to said plurality of channels counts a local time counter value which has a value offset from a global counter value as a standard value, for each of a plurality of connections corresponding to a channel concerned, and the local time counter value for each of the plurality of connections is processed to overflow when the global counter value reaches to an offset value corresponding to each of the plurality of connections.

7. The cell flowing ratio control method according to claim 5, further comprising the step of:
storing connections required to overflow with channel numbers to which the connections are respectively belonging in a table,
retrieving the table by a count value of a corresponding one of the time counters, and
executing overflowing of the time counter corresponding to a channel to which a connection is belonging, when the channel of the connection to be overflowed coincides a channel of a connection required to be overflowed, stored in the table.

8. The cell flowing ratio control method according to claim 6, further comprising the step of:
storing connections required to overflow with channel numbers to which the connections are respectively belonging in a table,
retrieving the table by a count value of a corresponding one of the time counters, and
executing overflowing of the time counter corresponding to a channel to which a connection is belonging, when the channel of the connection to be overflowed coincides a channel of a connection required to be overflowed, stored in the table.

9. The cell flowing ratio control method according to claim 7,
wherein a theoretical arrival time is indicated for said connection, and said overflow processing is executed by subtracting a specified value relating to (maximum value of the counter +1) of said corresponding time counter from said theoretical arrival time.

10. The cell flowing ratio control method according to claim 1,
wherein the step of controlling includes the steps of storing a parameter which is a basis for controlling the cell flowing ratio to the connection belonging to each of the plurality of channels in a table, said parameter being recorded by expressing with fixed decimal points and an exponential value on the position of the decimal point of said parameter being recorded, and calculating said parameter and the counted value in said time counter by shifting the figure of the counted value in said time counter by said exponential value.

11. The cell flowing ratio control method according to claim 9,
wherein said theoretical arrival time is expressed by an exponential value on the positions of a fixed decimal point and a decimal point, and after shifting said specified value for the figures required for the exponential value on the position of said decimal point, said overflow processing is executed by subtracting a figure-shifted specified value from said theoretical arrival time.

12. A cell switching system for receiving arrival cells transmitted from a plurality of channels and controlling to pass the received arrival cells, comprising:
a channel multiplexer for multiplexing the arrival cells flowing on said plurality of channels;
a plurality of time counters provided for the plurality of channels, only one time counter, corresponding to a channel to which an arrival cell is belonging, of the plurality of time counters being increased; and
a cell flowing ratio controller for controlling cell ration correspondingly to counted value of the increased time counter.

13. The cell switching system according to claim 12,
wherein said multiplexer attaches an identifier identifying each channel to which each of the arrival cells is belonging, and a time counter corresponding to a channel identified by the identifier.

14. The cell switching system according to claim 12,
wherein said multiplexer inserts dummy cells which are not belonging to any of the plurality of channels, and are used only for cell speed adjustment.

15. The cell switching system according to claim 13,
wherein said multiplexer inserts dummy cells which are not belonging to any of the plurality of channels, and are used only for cell speed adjustment.

16. The cell switching system according to claim 12,
wherein each of the plurality of time counters has counter values respectively shifted for each of a plurality of connections which are belonging to a corresponding channel, and the counter values are controlled, to overflow at timings respectively shifted.

17. The cell switching system according to claim 12,
wherein each of the plurality of time counters provided correspondingly to said plurality of channels counts a local time counter value which has a value offset from a global counter value as a standard value, for each of a plurality of connections corresponding to a channel concerned, and the local time counter value for each of the plurality of connections is processed to overflow when the global counter value reaches to an offset value corresponding to each of the plurality of connections.

18. The cell switching system according to claim 16,
further comprising a table for storing connections required to overflow with channel numbers to which the connections are respectively belonging,
wherein the table is retrieved by a count value of a corresponding one of the time counters, and the time counter corresponding to a channel to which a connection is belonging is overflowed, when the channel of the connection to be overflowed coincides a channel of a connection required to be overflowed, stored in the table.

19. The cell switching system according to claim 17,
further comprising a table for storing connections required to overflow with channel numbers to which the connections are respectively belonging,
wherein the table is retrieved by a count value of a corresponding one of the time counters, and the time counter corresponding to a channel to which a connection is belonging is overflowed, when the channel of the connection to be overflowed coincides a channel of a connection required to be overflowed, stored in the table.

20. The cell switching system according to claim 18, wherein a theoretical arrival time is indicated for said connection, and said overflow is executed by subtracting a specified value relating to (maximum value of the counter +1) of said corresponding time counter from said theoretical arrival time.

21. The cell switching system according to claim 12, further comprising a table for storing a parameter which is a basis for controlling the cell flowing ratio to the connection belonging to each of the plurality of channels, said parameter being recorded by expressing with fixed decimal points and an exponential value on the position of the decimal point of said parameter being recorded, and calculating means for calculating said parameter and the counted value in said time counter by shifting the figure of the counted value in said time counter by said exponential value.

22. The cell switching system according to claim 20, wherein said theoretical arrival time is expressed by an exponential value on the positions of a fixed decimal point and a decimal point, and after shifting said specified value for the figures required for the exponential value on the position of said decimal point, said overflow is executed by subtracting a figure-shifted specified value from said theoretical arrival time.

* * * * *